(No Model.) 2 Sheets—Sheet 1.

J. LONGMORE & W. L. WATSON.
MACHINE FOR DECORTICATING RHEA, &c.

No. 493,778. Patented Mar. 21, 1893.

Witnesses
J. M. Fowler Jr.
Thomas Durant

Inventors
James Longmore and
William L. Watson
By Clough & Clough
their Attorneys (No Model.) 2 Sheets—Sheet 2.

J. LONGMORE & W. L. WATSON.
MACHINE FOR DECORTICATING RHEA, &c.

No. 493,778. Patented Mar. 21, 1893.

Witnesses
J. M. Fowler Jr.
Thomas Durant

Inventors
James Longmore and
William L. Watson.
By Church & Church
their Attorneys

UNITED STATES PATENT OFFICE.

JAMES LONGMORE AND WILLIAM LIVINGSTONE WATSON, OF LONDON, ENGLAND.

MACHINE FOR DECORTICATING RHEA, &c.

SPECIFICATION forming part of Letters Patent No. 493,778, dated March 21, 1893.

Application filed October 8, 1891. Serial No. 408,198. (No model.) Patented in England May 12, 1890, No. 7,390.

*To all whom it may concern:*

Be it known that we, JAMES LONGMORE and WILLIAM LIVINGSTONE WATSON, both subjects of the Queen of England, residing at London, in England, have invented certain new and useful Improvements in Machines for Decorticating Rhea, Jute, and other Vegetable Fibrous Stems, (for which we have obtained a patent in England, No. 7,390, dated May 12, 1890,) of which the following is a specification.

Hitherto the machines used for the decortication of rhea, jute and other fibrous vegetable stems have usually been of complicated and costly construction and have not generally been arranged for operating continuously; besides this, many of the machines have proved faulty in use because, among other reasons, the gummy nature of the fibers has caused them to adhere to the rollers, traveling aprons or other parts of the machine and thus interfere with their proper delivery.

Now this invention has for its object to construct a machine in such a manner as to combine simplicity and cheapness of construction with continuity and reliability of operation and also so as to considerably increase the output of such machines.

A machine constructed according to the present invention consists essentially of three rollers viz.—one fluted or ribbed beating roller and two feeding rollers one or both of which may be grooved, serrated or otherwise roughened so as to deliver the stems to the beater in as uncrushed a condition as possible, this being found to give far better results than has resulted when the stem has been crushed previous to being submitted to the action of the beater. Two traveling aprons are preferably provided, one to deliver the unbroken stems regularly to the feed rollers and the other to take away from the beater the stems or fibers after they have been operated upon by said beater, the latter of these aprons being also arranged to remove from the lower feed roller any particles of the stems which may adhere thereto.

Figure 1:
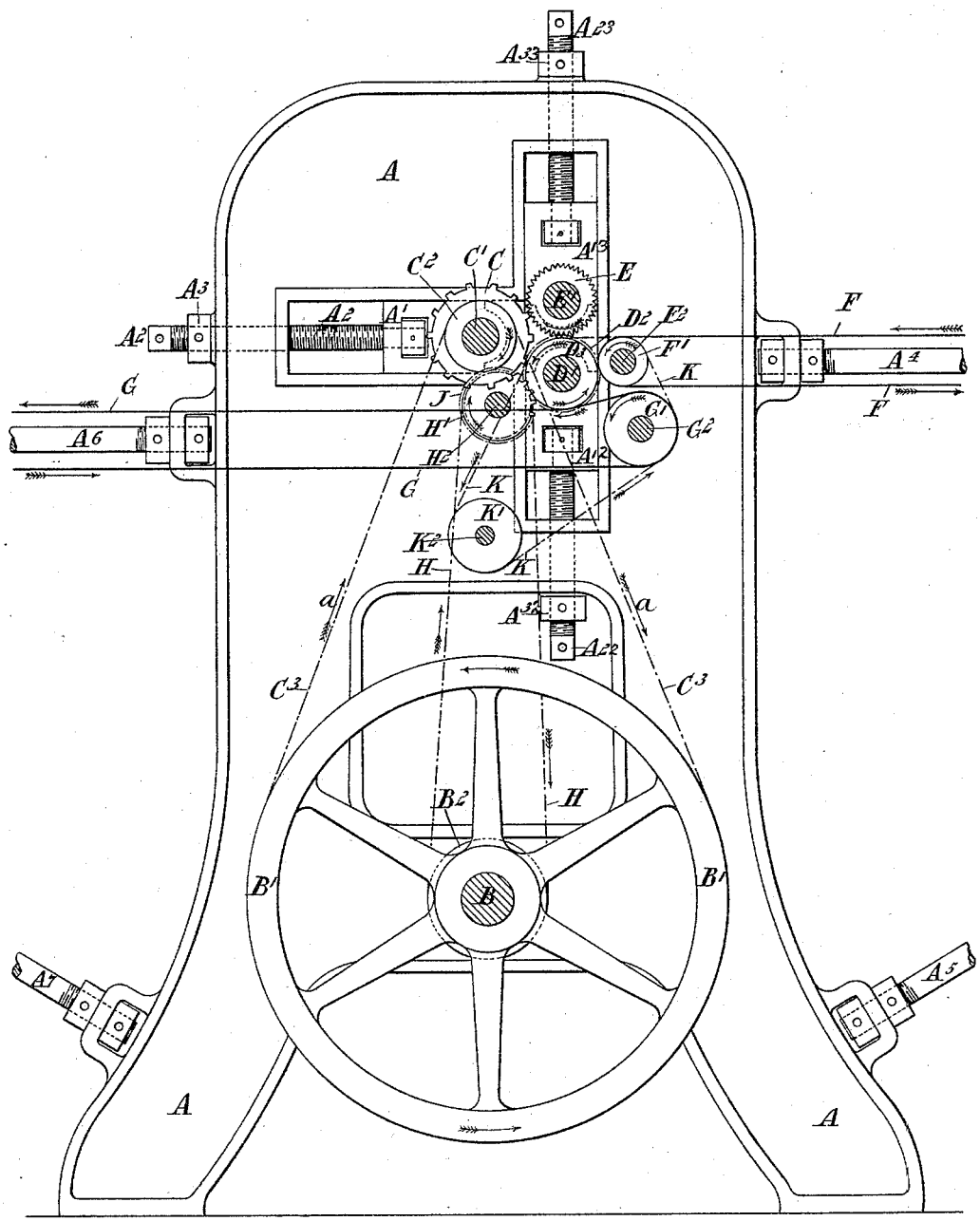
Figure 2:
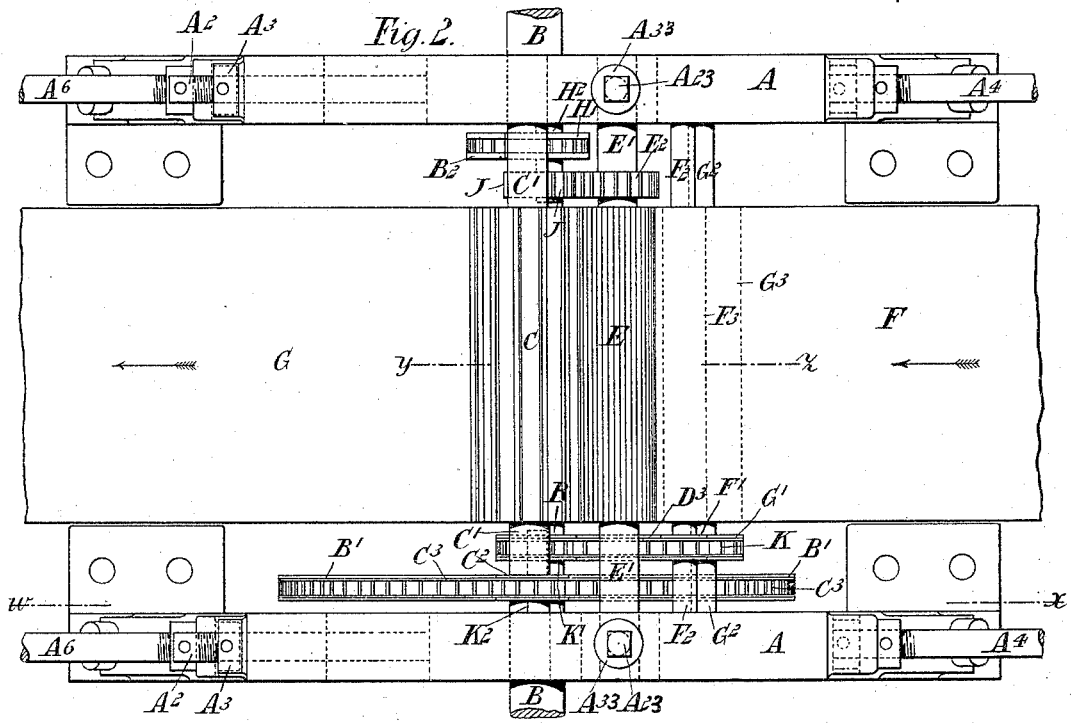
Figure 3:
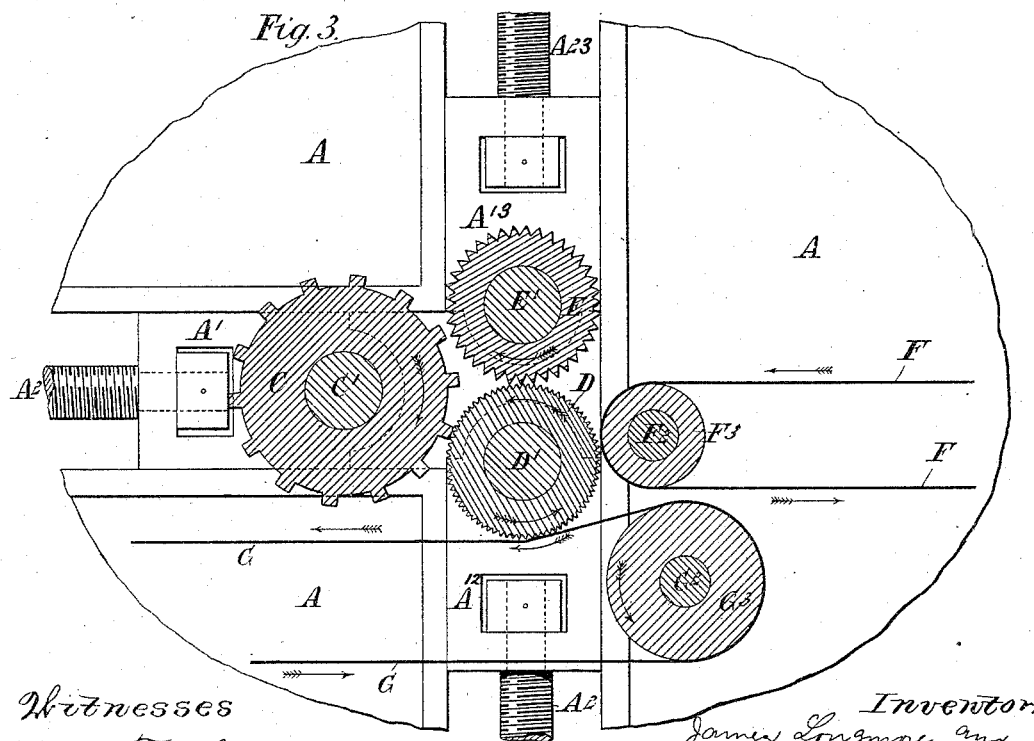

In the accompanying drawings Figures 1 and 2 are respectively a vertical section and a plan of a machine constructed according to this invention the section (Fig. 1) being taken on the line $w\,x$ of Fig. 2. Fig. 3 is a section drawn to a larger scale taken on the line $y\,z$ of Fig. 2.

Like letters indicate like parts throughout the drawings.

A are the two side frames which support the various parts of the machine and B is the main shaft to which rotary motion is imparted in any suitable manner.

B' is a pitch wheel at one side (the "near" side as in Figs. 1 and 2) of the machine secured on shaft B and of comparatively large size so as to drive the beater C at the required high rate of speed; on this shaft B at the other or "far" side of the machine as in Figs. 1 and 2 is another pitch wheel $B^2$ of smaller diameter than the wheel B', for driving the feed rollers D and E and the feeding and delivering aprons F and G at the required rate of speed which is preferably considerably slower than that of the beater C. The shaft C' of the beater at the "near" side of the machine has secured on it the pitch wheel $C^2$ over which passes the chain $C^3$ which is driven in the direction of the arrows $a$ Fig. 1 by the wheel B', and the said shaft is supported in two bearing blocks A' each of which is adjustable by a screw $A^2$ in one side frame A of the machine; this adjustment enables the beater C to be moved nearer to or farther from the feed rollers D and E and when so adjusted the beater can be retained in such adjusted position by lock nuts $A^3$ on the screw $A^2$.

The shafts D' and E' of rollers D and E like that of the beater C are each supported in adjustable bearing blocks $A^{12}$ and $A^{13}$ respectively these being movable up and down each by its screw $A^{22}$ or $A^{23}$ which may be locked in any desired position by means of the lock nut $A^{32}$ or $A^{33}$ threaded upon it.

H is the chain which, driven by the pitch wheel $B^2$, transmits motion to the wheel H'. This wheel is mounted on a shaft $H^2$ carried by one of the frames A the said shaft also having mounted on it the toothed wheel or pinion J which rotates in unison with the wheel H'. The wheel J gears with the wheel D² Fig. 1 secured on the "far" end of the feed roller shaft D' and the wheel D² gears with the wheel E² Fig. 2 secured on the adjacent end of the feed roller shaft E' above it.

On the "near" end of the roller shaft D' is secured a pitch wheel D³ around which passes a chain K which gears with and transmits motion to the wheels F' and G' secured respectively on the shafts F² G² of the rollers F³ G³ which give motion to the endless aprons F and G respectively; besides the wheels D³ F' G' the chain K passes around the wheel K' which is mounted on a short shaft or stud K² secured to the "near" frame A and which may be adjustable so as to enable the tension of the chain K to be regulated. The shafts F² and G² may be supported in stationary bearings formed in the two side frames A or they may be arranged in slots or guides so as to be capable of adjustment nearer to or farther from the lower feed roller D so as to admit of larger or smaller apron rollers being applied for the purpose of operating the aprons F and G quicker or slower.

The roller F³ causes the apron F to travel in close proximity to but not necessarily in contact with the feed roller D. The outer part of the apron F (not shown in the drawings) passes around another roller which may be supported at the junction of the tie bolts A⁴ with A⁵ which may be adjusted so as to slacken or tighten said apron.

The roller G³ causes the apron G to travel in contact with the feed roller D so as to rub off from its surface any particles of the stems of fibers tending to adhere thereto; the parts of the roller D and apron G in contact with each other travel in opposite directions as will be seen by referring to the arrows in Figs. 1 and 3. The outer part of the apron G like that of the apron F passes over a roller not shown in the drawings but which may be supported at the junction of the tie bolts A⁶ with A⁷ which bolts provide for any required adjustment in the tension of such apron.

It is specially advantageous to have the lower feed roller D grooved or serrated as shown in Fig. 3, as in this form it provides what may be termed an endless series of beating edges.

The operation of the before described apparatus is as follows:—The stems to be treated are laid longitudinally on the apron F which carries them to the rollers D and E between which they are nipped and by which they are fed to the beater C. The rollers D and E merely nip the stems sufficiently to insure their regular feed to the beater and to prevent the said stems being dragged between them by the action of the beater C and it is preferred to adjust these rollers D and E by their screws A² so that they will exert upon the stems just sufficient pressure for this purpose and not such as would crush the stems to any appreciable detrimental extent. After passing between the rollers D and E the stems are subjected to a continuous and rapid succession of blows from the ribs or blades of the beater C delivered on one side of the stems, the other side being supported on the series of edges of the roller D; this results in the woody interior of the stems being broken into fine particles and loosened within the unbroken epidermis so that the said interior may afterward readily be removed by shaking the stems by hand.

It will be noted that the lower roller (D) has its surface covered with relatively fine serrations, preferably much finer than the serrations on the upper roller, thus the beater acts not on one particular rib at any particular moment, but on a number of ribs or serrations. This will be readily understood from an inspection of Fig. 3 where it will be seen that as each blade of the beater passes the roll D a stalk held between the two would be crushed against a number of the serrations with about equal force, the effect being to accomplish the desired result much more perfectly than heretofore to say nothing of the advantage incident to the presentation of cleaned serrations for action on each successive portion of the stalks.

Any particles of the pellicle or other gummy fragments tending to adhere to the roller D will be prevented from doing so by the apron G rubbing them off the surface of D and conveying them out of the machine along with the treated stems.

Though the machine has been described as having the rollers D and E fluted or serrated, this having been found to give the most satisfactory results, yet good results may be secured by the employment of a fluted or serrated roller D and a smooth roller E it being indispensable that one at least of these rollers shall be roughened to retain the stem against the dragging action of the beater.

One very great advantage secured by the before described machine is that practically the whole length of the stem is uniformly operated on by the beater C, no portion of the stems being in practice found to have escaped treatment.

We claim—

1. In a decorticating machine, the combination with the beater and serrated upper feed roll, of the lower feed roll against which the stems are broken by the beater, having its surface covered with serrations finer than the serrations on the upper roll; substantially as described.

2. In a decorticating machine, the combination with the beater and upper feed roll, of the finely serrated lower feed roll against which the stems are broken by the beater and a belt running in contact with said serrated roll whereby the serrations therein are cleaned; substantially as described.

3. In a decorticating machine the combination with two feed rollers such as D and E the former of which is fluted serrated or otherwise roughened and against which the stems are broken, of a rotating beater for breaking the stems against said roller and an apron such as G traveling in contact with the roller D so as to automatically remove any particles adhering thereto and at the same time deliver the decorticated stems from the machine substantially as herein described.

In testimony whereof we have hereto set our hands in the presence of the two subscribing witnesses.

JAMES LONGMORE.
WILLIAM LIVINGSTONE WATSON.

Witnesses to the signature of James Longmore:
JOSEPH G. NADEN,
THOS. HEATH.

Witnesses to the signature of William Livingstone Watson:
JNO. D. TANNAHILL,
G. F. WARREN.